United States Patent [19]

Stage

[11] 4,426,322

[45] Jan. 17, 1984

[54] METHOD AND APPARATUS FOR THE DESALINATION OF CRUDE TALL OIL

[76] Inventor: Hermann Stage, Ludgeristrasse 9, 4400 Muenster, Fed. Rep. of Germany

[21] Appl. No.: 447,215

[22] Filed: Dec. 6, 1982

[30] Foreign Application Priority Data

Jul. 7, 1982 [DE] Fed. Rep. of Germany ....... 3225337

[51] Int. Cl.³ .......................... C09F 1/00; B01D 1/22; B01D 3/08
[52] U.S. Cl. ................................. 260/97.7; 260/97.6; 159/13 A; 159/13 B; 159/13 R; 159/49; 202/236; 203/89
[58] Field of Search ............................ 260/97.7, 97.6; 159/13 A, 13 B, 13 R, 49; 202/236; 203/89

[56] References Cited

U.S. PATENT DOCUMENTS

| 3,948,874 | 4/1976 | Palinqvist | 260/97.7 |
| 3,965,085 | 6/1976 | Holinboon et al. | 260/97.6 |
| 4,248,769 | 2/1981 | Johanssen | 260/97.7 |

FOREIGN PATENT DOCUMENTS

| 2736357 | 2/1979 | Fed. Rep. of Germany . | |
| 702821 | 1/1954 | United Kingdom | 260/97.7 |

Primary Examiner—H. S. Cockeram
Attorney, Agent, or Firm—Watson, Cole, Grindle & Watson

[57] ABSTRACT

Crude tall oil and water undergo a mass transfer at predetermined temperature and pressure values so as to remove salts from the oil. The flow of the crude oil through a collector disposed beneath an evaporator is maintained at a speed 8 to 80 times less than the trickling speed of the crude oil flowing through the evaporator. Salts are also precipitated from the crude oil by a cooling process.

21 Claims, 2 Drawing Figures

METHOD AND APPARATUS FOR THE DESALINATION OF CRUDE TALL OIL

BACKGROUND OF THE INVENTION

1. Field of the Invention

This invention relates generally to a method and apparatus for removing dissolved or emulsified salts from crude tall oil derived from sulfate soaps, and more particularly to a method and apparatus in which crude tall oil and water at predetermined temperature, pressure and flow rate values undergo mass transfer.

2. Description of the Prior Art

Crude tall oil derived from the conventional discontinuous or continuous breakdown of sulfate soaps of cellulose extraction retains a residual amount of dissolved or emulsified alkali sulfates. The amount of dissolved or emulsified salts remaining in the crude tall oil, which varies within relatively broad limits depending on the breakdown method used, can be derived from the ash content after incineration of the tall oil. Approximately 0.1–0.2% by weight of ash accumulation, which corresponds to 0.23–0.46% by weight of sodium sulfate is common. Since these salts do not evaporate under the distillation conditions of tall oil distillation for the separation of pitch, they remain in the non-evaporated part during all evaporation and distillation steps during the preparation of tall oil.

The above-noted conditions limits the total distillate portion obtainable. A loss of only a few weight percents makes a considerable economic difference. Moreover, such salts induce a rather strong incrustation upon evaporator heating surfaces by forming salt deposits thereon even with careful evaporation, resulting in a highly undesirable drop in output. A careful cleaning at relatively short intervals of time is therefore required to eliminate these incrustations. Such cleaning considering the thermal and especially the oxidiative sensitivity is very time-consuming and thus very expensive, because such cleaning time further diminishes output, which has been noticeably lowered already by the diminished passage of heat resulting from the above-noted incrustation.

It is known in the continuous breakdown of sulfate soap by sulfuric acid that a subsequent hot water wash of the crude tall oil accumulating during the decomposition of the soap can be performed at 70°–80° C.; however, in the subsequent distillative work-up the aforementioned problems can not be eliminated.

SUMMARY OF THE INVENTION

Accordingly, this invention has been made to overcome the problems described above, and has therefore an object to increase the amount of distillate of the crude tall oil, that is, to increase the amount of unsaturated fatty acids and resin acids.

A further object is to reduce the formation of incrustations on evaporator heating surfaces.

The foregoing and other objects are achieved according to the present invention by the provision of a method and apparatus for mass transfer between water and crude tall oil at temperatures over 100° C. and under predetermined pressure values such that the water remains in a liquid aggregate state.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts through the several views and wherein.

DETAILED DESCRIPTION OF THE PREFERRED EMBODIMENT

Figure 1:
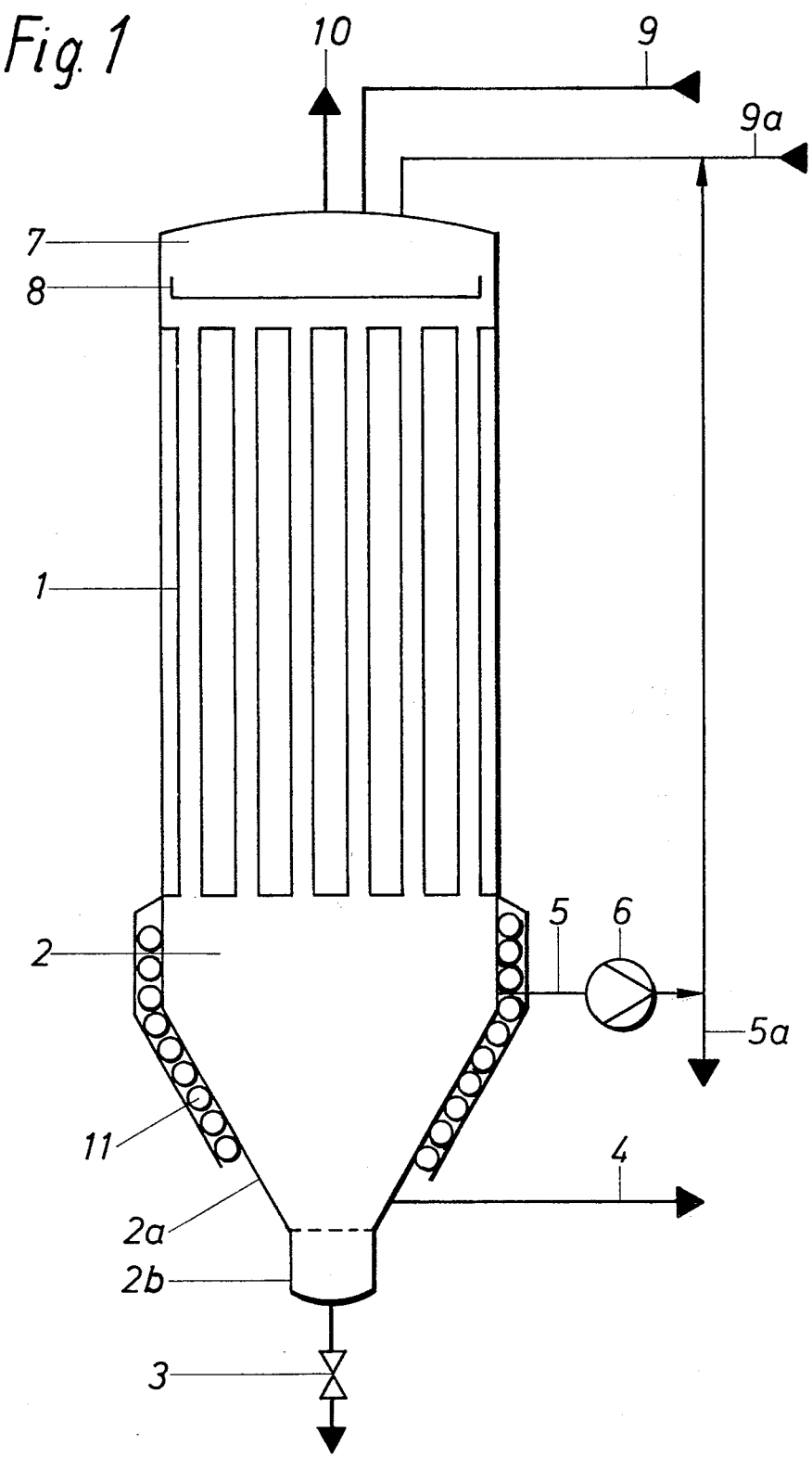
FIG. 1 is a front sectional schematic elevation view of the apparatus in accordance with the present invention.

The method and apparatus developed in accordance with the present invention will now be described wherein hot water undergoes a mass transfer with tall oil at temperatures over 100° C. and under such a pressure that the hot water remains in a liquid aggregate state.

According to a preferred embodiment of the invention, the mass transfer is performed in a countercurrent process, that is in a packed column. Extraction should occur below 250°, preferably in a temperature range between 100° and 160° C. A temperature range between 120° and 140° C. is especially effective. Packed columns and especially pulsation columns with packing or with 40–60 sieve plates spaced at an interval of 50–200 mm, preferably 100 mm, are especially good for salt extraction with water under pressure in the temperature range indicated. The work pressure of the extraction system must be chosen so that at a present extraction temperature of, for example 130° C., no appreciable evaporation of water into the inert gas which is used to create pressure at the evaporator head, can occur. A work pressure of 5 bars, for example, is suitable for the specified temperature of 130° C.

In accordance with the present invention it is shown that the salt content of crude tall oil can be reduced to practically any low amount in a relatively short time with the method of the present invention, in contrast to the known methods of hot water extraction.

In addition, after a film evaporation is performed at customary trickling speeds, the flow speed of the liquid collecting under the film diminishes to 8 to 80 times less than the trickling speed and preferably to 20 to 40 times less than the trickling speed. The liquid is subjected to a slight subcooling between 1° to 5°, preferably 2° to 3° C. below its boiling temperature, and the salts which accumulate thereby are removed. The trickling speed in the film evaporator should not drop below 0.2 m/sec. and a speed of 2 m/sec. should not be exceeded. The preferred range of the trickling speed is 0.6 to 0.9 m/sec.

Apparently, the elimination of salt by oversaturation does not occur spontaneously, but rather only after a certain incubation period, which elimination is naturally favored by the presence of crystallization nuclei. The present invention demonstrates that in order to obtain an appreciable elimination of salt, current movements in the liquid concentrate must be suppressed to a great extent, and a slight subcooling is decisive as an additional release for the precipitation of the salt. The salts are then eliminated from the circulation, such as in a cyclic method or before a subsequent distillation stage.

In order to obtain this effect with machinery, an appropriately dimensioned salt separator, preferably with a conical bottom, for example, is built into the circulation line of the falling film evaporator on the suction side of a circulation pump. The volume, width and height of the separating container between the intake and the overflow of the circulation volume is preferably dimensioned so that for the latter an average holding time of 2 to 20 minutes and preferably of 5 to 10 minutes results. A small branch current of 1 to 4% by weight of the intake and preferably 2 to 3% by weight is removed either continuously or intermittently with the eliminated crystals via a run-off valve in the conical bottom of the separator and directly into an appropriate recipient vessel. The separating container can also be constructed as a container separated from the falling film evaporator, into which the sump liquid of the falling film evaporator is introduced.

Both methods, that is, the hot water extraction according to the present invention and the precipitation of the salts according to the present invention can be combined so that first the precipitation of the salts is performed and then the hot water extraction of the salt-pitch mixture is performed. This can be advantageous in particular in an existing system because the machinery cost for the hot water extraction is then relatively low. If, on the other hand, the hot water extraction according to the invention is performed first, it is then superflous to add the salt precipitation method according to the present invention.

On account of the comparatively poor water solubility of resin acids and of fatty acids in the specified temperature range compared to the good water solubility of sodium sulfate at 140° C. of, for example, 29.5%, only a small amount of water of 1 to 4% by weight and preferably 2 to 3% by weight (in relation to the amount of crude tall oil added) is needed for the extractive removal of the salt content from the salt concentrate drain if a countercurrent extraction system with an effectiveness of 4 to 6 theoretical transfer units is used which operates as a mixer-settler or also as a countercurrent column, such as in the form of a packed column which can be operated with or without pulsation.

Even in the hot water extraction method according to the present invention the water consumption remains within narrow limits regardless of the reduced solubility at these temperatures. It was established in extraction experiments with crude tall oil that salt contents considerably lower than those in the salt precipitation method according to the present invention could be obtained solely by a countercurrent water wash at a superpressure in a temperature range between 100° and 160° C. and preferably between 120° and 140° C. with a system whose effectiveness corresponds to 4 to 6 theoretical transfer units. It was found that when a countercurrent column was used which had a water amount of 6 to 10% in relation to the crude tall oil throughput and preferably 8%, the salt content was diminished so greatly, that no discernable incrustations of heating surfaces by salt deposits occured in the subsequent distillative workup for the separation of pitch.

The methods and devices of the invention can be used, for example, in conjunction with the method of DE-Patent No. 2,736,357.

The straight distillation stage for separating pitch is constructed as a flash and film evaporation stage with two falling film evaporators having head pressures between 1.333 and 6.665 mbars and preferably at 2.666 mbars. The first falling film evaporator operates under forced circulation at a minimum of 200° C. and a maximum of 230° C. and supplies over 90% of the distillate including the flash portion. The rest of the feed is highly heated up to a run-off temperature of a minimum of 240° C. and a maximum of 225° C. in a film evaporation stage operated without forced circulation with the addition of a minimum of 0.15 to a maximum of 0.25%, preferably 0.2% open steam, this being in relation to the amount of pitch to be drawn off.

The invention as it relates to the salt precipitation method is now explained with reference made to the schematic drawings. Collector container or vessel 2 is located under film evaporator 1. The dimensions of this container are selected so that it assures a relatively long holding time of the liquid phase in the collector container. Collector chamber 2 is formed into a lower conical area 2a. The precipitation of the salt occurs on the conical surfaces. The precipitated salt slides along surfaces 2a into outlet piece or salt collection piece 2b, from which the salt, which is generally mixed with pitch, is removed by valve 3. Schematically indicated return line 5 is located on liquid collector container 2. Suction pump 6 is in this line 5, which feeds the liquid phase back into head 7 of the column in order to establish a forced circulation. A supply line 9 also empties into head 7. In addition to or instead of supply line 9 a supply line 9a can be provided, which empties into supply line 5. A line 4 can be provided above salt collection piece 2b in order to make it possible to remove liquid for the following column, which can operate, for example, without forced circulation. In addition to or instead of removal line 4, a removal line 5a can be provided on return line 5. The distillate of the falling film evaporator is taken off via the vapor line.

Collector vessel 2 is provided with a cooling device 11 including, for example, a helical cooling pipe through which a coolant flows for achieving the required subcooling of the liquid.

Figure 2:
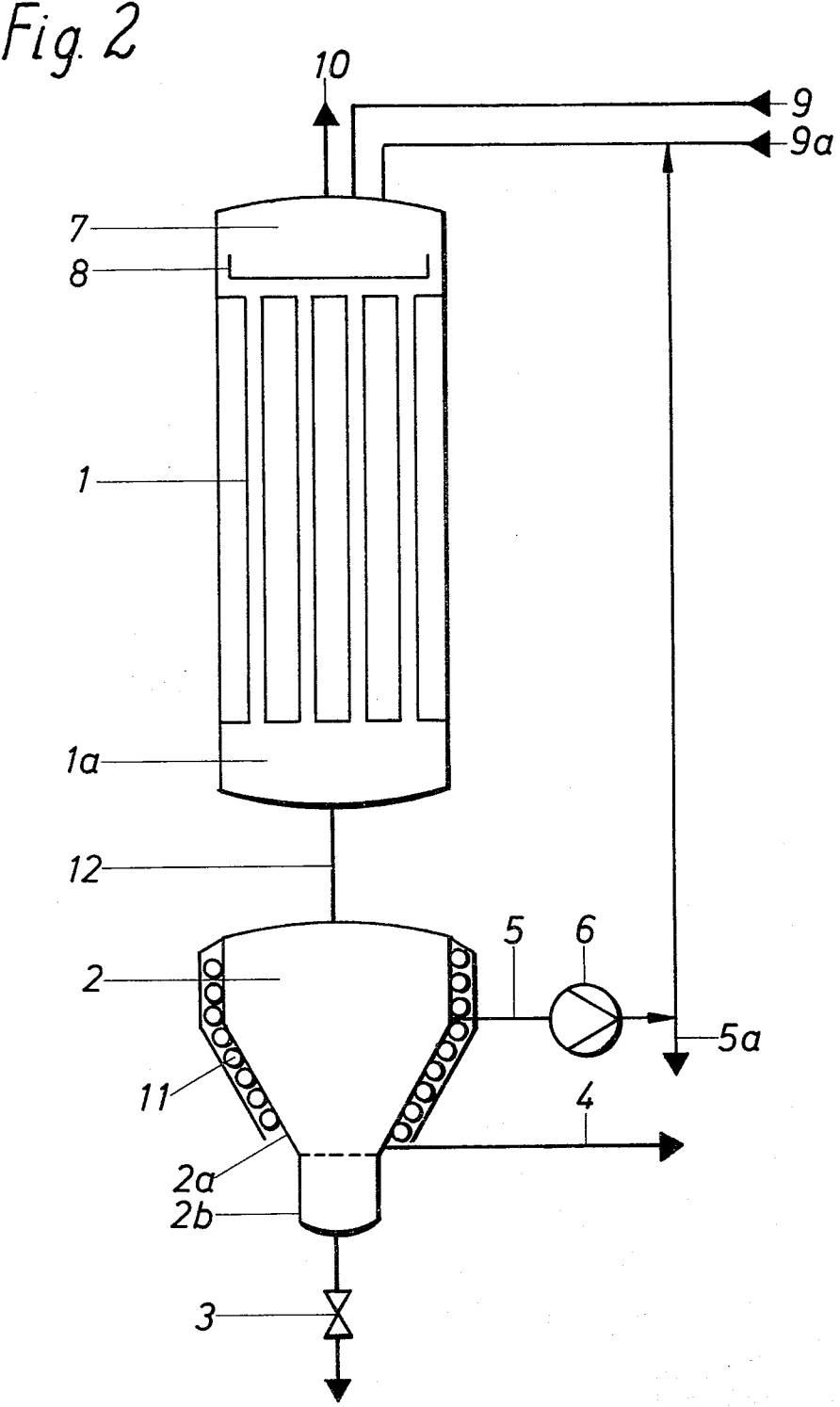
FIG. 2 is a front sectional schematic elevation view of the apparatus in accordance with a second embodiment of the present invention.

The embodiment according to FIG. 2 differs from that of FIG. 1 in that film evaporator 1 is separate from collector container 2. The liquid phase in sump 1a of the film evaporator flows through line 12 into collector container 2.

Obviously, numerous modifications and variations of the present invention are possible in light of the above teachings. It is therefore to be understood that within the scope of the appended claims, the invention may be practiced otherwise than as specifically described herein.

What is claimed is:

1. A method for removing salts from crude tall oil having said salts dissolved or emulsified therein, wherein said method comprises:
   providing and contacting water with said oil at a temperature above 100° C.;
   maintaining said oil and said water under a predetermined pressure; and
   effecting a mass transfer between said water and said oil such that said water remains in a liquid aggregate state.

2. A method according to claim 1 which further comprises effecting said mass transfer in a countercurrent process.

3. A method according to claim 2 wherein said countercurrent process further comprises a packed column countercurrent process.

4. A method according to claim 1, 2 or 3 which further comprises maintaining said temperature below 250° during said mass transfer.

5. A method according to claim 1, 2 or 3 which further comprises maintaining said temperature between 100° C. and 160° C. during said mass transfer.

6. A method according to claim 1, 2 or 3 which further comprises maintaining said temperature between 120° C. and 140° C. during said mass transfer.

7. A method for removing salts from crude tall oil using a film evaporator, a liquid collector disposed below said film evaporator and a cooling device operatively associated with said liquid collector, said crude tall oil having said salts dissolved or emulsified therein, wherein said method comprises:
   performing a film evaporation on said crude tall oil at a predetermined trickling speed in said film evaporator;
   collecting said crude tall oil in a liquid state in said liquid collector;
   maintaining a flow speed of said crude tall oil in said liquid collector at a speed 8 to 80 times less than said predetermined trickling speed;
   subjecting said crude tall oil in said liquid collector to a subcooling between 1° C. to 5° C. below a boiling temperature of said crude tall oil with said cooling device;
   precipitating said salts from said crude tall oil in said liquid collector; and
   removing continuously said salts from said liquid collector.

8. A method according to claim 7 wherein maintaining said flow speed further comprises maintaining said flow speed of said crude tall oil in said liquid collector at a speed 20 to 40 times less than said predetermined trickling speed.

9. A method according to claim 7 or 8 wherein said subcooling further comprises subcooling between 2° C. to 3° C. below said boiling temperature of said crude tall oil.

10. A method for removing salts from crude tall oil using a film evaporator, a liquid collector disposed below said film evaporator and a cooling device operatively associated with said liquid collector, said crude tall oil having said salts dissolved or emulsified therein, wherein said method comprises:
    performing a film evaporation on said crude tall oil at a predetermined trickling speed in said film evaporator;
    collecting said crude tall oil in a liquid state in said liquid collector;
    maintaining a flow speed of said crude tall oil in said liquid collector at a speed 8 to 80 times less than said predetermined trickling speed;
    subjecting said crude tall oil in said liquid collector to a subcooling between 1° C. to 5° C. below a boiling temperature of said crude tall oil with said cooling device;
    precipitating said salts from said crude tall oil in said liquid collector; and
    removing discontinuously said salts from said liquid collector.

11. A method according to claim 10 wherein maintaining said flow speed further comprises maintaining said flow speed of said crude tall oil in said liquid collector at a speed 20 to 40 times less than said predetermined trickling speed.

12. A method according to claim 10 or 11 wherein said subcooling further comprises subcooling between 2° C. to 3° C. below said boiling temperature of said crude tall oil.

13. A method according to claim 7, 8, 10 or 11 which further comprises maintaining said predetermined trickling speed at a speed between 0.2 m/sec. and 2 m/sec., inclusive.

14. A method according to claim 7, 8, 10 or 11 which further comprises maintaining said predetermined trickling speed at a speed between 0.6 m/sec. and 0.9 m/sec., inclusive.

15. A method according to claim 7, 8, 10 or 11 which further comprises maintaining said crude tall oil within said liquid collector for an average holding time between 2 to 20 minutes.

16. A method according to claim 13 which further comprises maintaining said crude tall oil within said liquid collector for an average holding time between 2 to 20 minutes.

17. A method according to claim 14 which further comprises maintaining said crude tall oil within said liquid collector for an average holding time between 2 to 20 minutes.

18. A method according to claim 15 wherein maintaining said crude tall oil within said liquid collector further comprises maintaining said crude tall oil within said liquid collector for an average holding time between 5 to 10 minutes.

19. A method according to claim 13 which further comprises maintaining said crude tall oil within said liquid collector for an average holding time between 5 to 10 minutes.

20. A method according to claim 14 which further comprises maintaining said crude tall oil within said liquid collector for an average holding time between 5 to 10 minutes.

21. A method according to claim 7, 8, 10 or 11 which further comprises:
    drawing said crude tall oil in a liquid state from said liquid collector;
    providing and contacting water with said crude tall oil drawn from said liquid collector at a temperature above 100° C.;
    maintaining said crude tall oil drawn from said liquid collector under a predetermined pressure;
    effecting a mass transfer between said water and said crude tall oil drawn from said liquid collector such that said water remains in a liquid aggregate state; and
    introducing said crude tall oil drawn from said liquid collector into a subsequent distillation after effecting said mass transfer.

* * * * *